June 21, 1955    R. H. SACHTLEBER    2,711,024
DRAFTING APPARATUS
Filed Jan. 16, 1953    2 Sheets-Sheet 1

RUDOLPH H. SACHTLEBER
INVENTOR.
BY
attorney

June 21, 1955  R. H. SACHTLEBER  2,711,024
DRAFTING APPARATUS
Filed Jan. 16, 1953                                    2 Sheets-Sheet 2
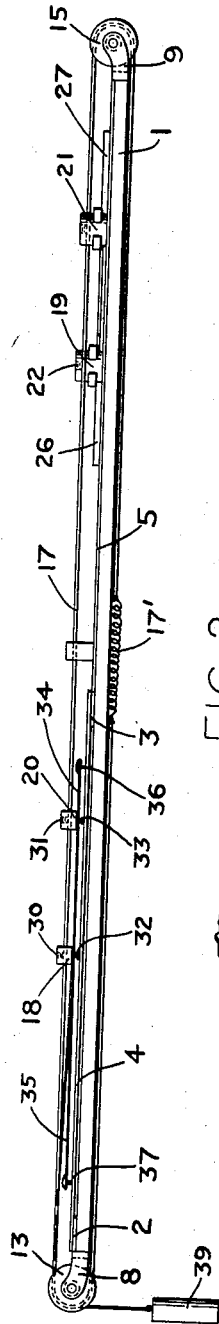
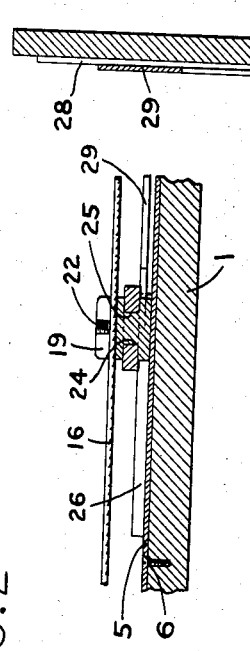
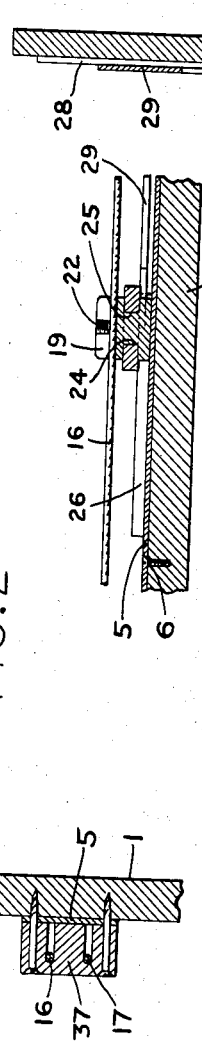
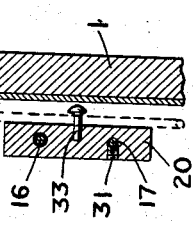
RUDOLPH H. SACHTLEBER
INVENTOR.
BY

United States Patent Office 2,711,024
Patented June 21, 1955

2,711,024

DRAFTING APPARATUS

Rudolph H. Sachtleber, East Orange, N. J.

Application January 16, 1953, Serial No. 331,549

12 Claims. (Cl. 33—77)

This invention relates generally to drafting apparatus and more particularly to a drafting apparatus for plotting a perspective view of a three dimensional object from a plan view and side elevation thereof to the same scale.

It is difficult for a draftsman to prepare a perspective drawing of an object from various views thereof and even where the object is available for direct measurement it still presents a formidable and tedious task. Accordingly, various perspective drafting devices have been developed to assist the draftsman in the preparation thereof such as my prior Patent No. 1,918,216.

These perspective drafting devices, however, have never gained wide acceptance because they presented certain problems such as the difficulty of use, for practical purposes, which may be inherent in the apparatus or in the results obtained such as an inverted perspective view, or the complicated nature of the apparatus made it relatively expensive so that manufacturers of drafting apparatus are reluctant to undertake the cost of manufacturing and marketing these devices.

The present invention covers a relatively simple perspective drafting apparatus mounted on an ordinary drawing board to coact with a fixed plan view and a slidable elevation view of an object to the same scale, which elevation view is disposed on the same sheet of drawing paper on which the perspective view of the object will be produced, points being taken off the plan view by the apparatus for their vertical position in the perspective drawing while the horizontal position of the point is established by movement of the slidable sheet, joinders of the points producing the finished perspective view of the object.

Accordingly, it is an object of the present invention to produce a drafting apparatus for making perspective drawings of any three dimensional object in which every point in the perspective view of the object can be delineated from a corresponding point in a plan view and elevation view, to the same scale, of the object.

It is another object of the present invention to produce a drafting apparatus which will create an upright as against an inverted perspective view of the object.

It is a further object of the present invention to provide an apparatus in which arbitrary vanishing points movable with the drawing site are established from a plan view and an elevation view of the same scale slidable with the drawing site, which arbitrary vanishing point allows the apparatus to locate and transfer to the drawing site the vertical position of any point in the plan view while the slidable elevation and drawing site establish the horizontal position thereof.

With this and other objects in view, as may appear from the accompanying specification, the invention consists of various features of construction and combination of parts, which will be first described in connection with the accompanying drawings, showing a drafting apparatus of a preferred form embodying the invention, and the features forming the invention will be specifically pointed out in the claims.

In the drawings:

Figure 2 is a side elevation showing the invention.

Figure 3 is a cross-section taken on the line 3—3 of Figure 1.

Figure 4 is a cross-section taken on the line 4—4 of Figure 1.

Figure 5 is a cross-section taken on the line 5—5 of Figure 1.

Figure 6 is a cross-section taken on the line 6—6 of Figure 1.

Figure 1:
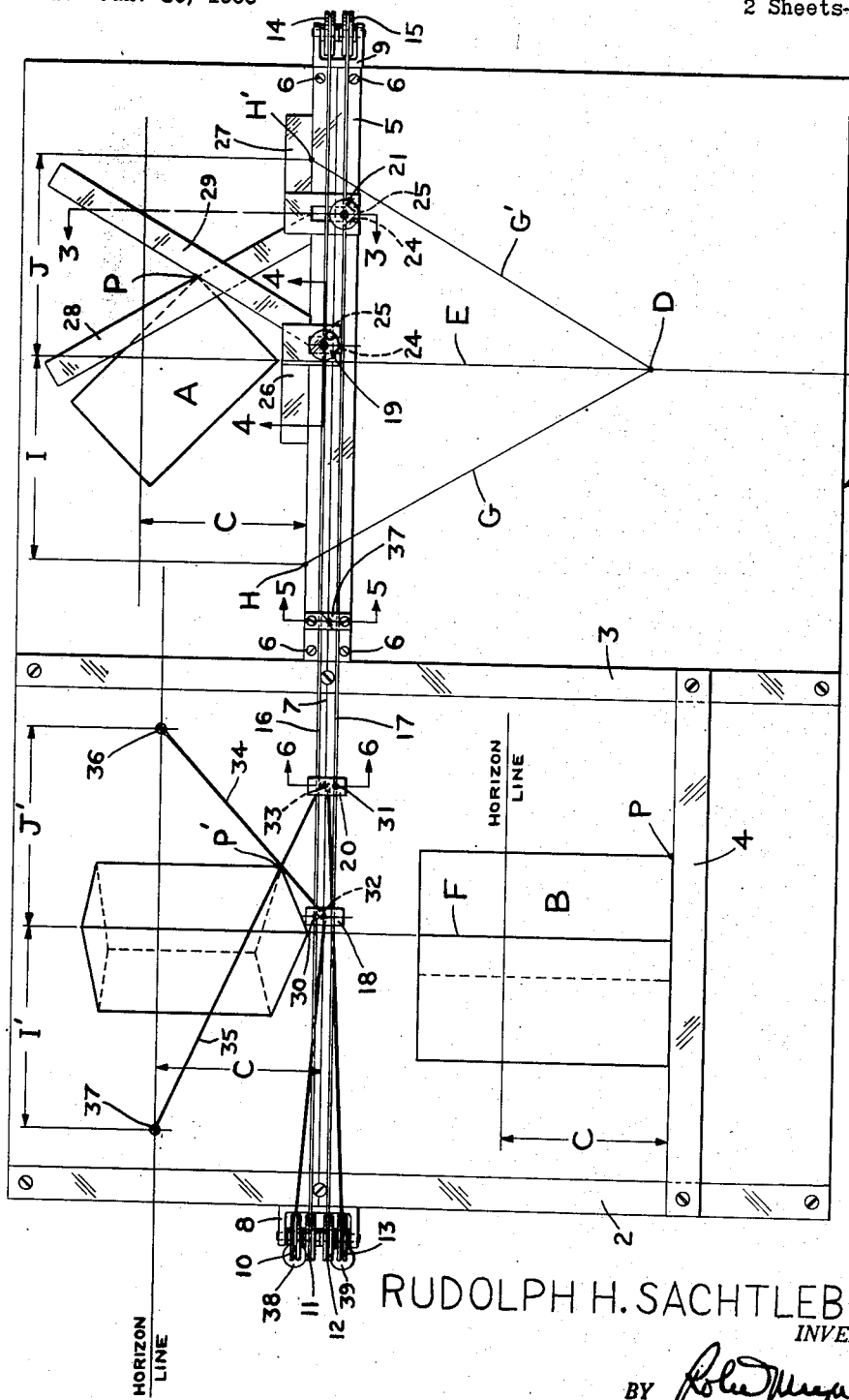
Figure 1 is a plan view showing the invention.

Referring more particularly to the drawings, Figures 1 and 2 show an ordinary drawing board 1 having a rectangular upper flat surface, which type drawing boards are well known in the art and are easily purchasable on the open market. Connected adjacent one edge of the shorter length of said drawing board 1 is a flat vertical guide 2 and spaced therefrom on the upper flat surface transversely of the longer length of the drawing board is a second vertical guide 3.

Vertical guides 2 and 3 support a transverse horizontal member 4 so that there is a clearance between the upper surface of the drawing board 1 and the transverse horizontal member 4 substantially the thickness of the vertical guides 2 and 3 under which a sheet of drawing paper may be easily moved alone or attached to a thin piece of heavier board, cardboard or the like whichever is most desirable.

On the side of the drawing board 1 opposite to the transverse horizontal strip 4, a straight edge member 5 is affixed to the upper surface of the drawing board 1 by suitable means such as threaded members 6 in the medial part thereof and perpendicular to the second vertical guide 3.

The vertical guides, the transverse horizontal member, and the straight edge may be composed of any suitable material such as aluminum metal strips, chromium metal strips, plastic strips or the like, all of which are easily purchasable on the open market.

A ground line 7 is laid across the long length of the upper surface of said drawing board 1 parallel to the long edge of the straight edge 5. Disposed at opposite ends of said ground line 7 are pulley brackets 8 and 9, substantially U-shaped members, pulley bracket 8 being somewhat larger than pulley bracket 9. Pulley bracket 8 rotatably supports four spaced pulleys 10, 11, 12 and 13, and pulley bracket 9 rotatably supports spaced pulleys 14 and 15, so that pulleys 11 and 14 and 12 and 15 are in substantial alignment with each other. This construction allows cables or belt members 16 and 17 to be trained about said pulley pairs 11 and 14 and 12 and 15 respectively, their ends being connected underneath said drawing board 1 by a spring member 17' whereby the cable members are held under tension and clear all surfaces of the drawing board 1 and can be moved easily in either direction across the upper surface of the drawing board 1 about the pulley pairs 11 and 14 and 12 and 15, all of which is clearly shown by Figures 1 and 2 of the drawings.

Cross-arms and supports

Disposed on either side of the vertical guide 3, and affixed in spaced relation on said cable member 16, for simultaneous movement therewith are upper positioner 18 and upper cross-arm support member 19. Similarly disposed in spaced relation on the cable member 17 are lower positioner 20 and lower cross-arm support member 21, for simultaneous movement with said cable member 17. Manual movement of either of the cross-arm supports 19 and 21 will produce equidistant movement of the respective positioners 18 and 20, as is clearly shown in Figures 1 and 2 of the drawings.

Figures 3 and 4, show that the cross-arm supports 19 and 21 are substantially identical cylindrical members, having their lower surfaces in sliding contact with the upper surface of said straight edge 5 and connected to said cable members 16 and 17 respectively, through bores transversely disposed in the upper ends thereof through which the cable members are threaded, set screws 22 and 23 therein adapted to lock the cross-arm supports 19 and 21 in any convenient position of the cable to allow movement of the supports relative to each other.

Each of the cross-arm supports 19 and 21 have grooves 24 and 25 transversely of the axial line thereof and disposed on opposite sides thereof, to receive the legs of L-shaped base members 26 and 27. L-shaped base members 26 and 27 are mounted with respect to the upper surface of the drawing board 1 and the straight edge 5 so that the longer legs thereof are extended in opposite directions and are in sliding engagement with the upper surfaces of the drawing board 1 and the upper edge of the straight edge 5, as is clearly shown in Figures 1 and 3 of the drawings.

Connected to the L-shaped base member 26 is an elongated slat-like cross-arm 29 which is disposed thereon at an acute angle to the ground line 7, and similarly L-shaped base member 27 is connected to an elongated slat-like cross-arm 28 disposed at an obtuse angle to the ground line 7. Both cross-arms 28 and 29 so positioned on the respective L-shaped base members 26 and 27 that on movement of the members 26 and 27, they clear each other and are adapted to form an intersection over a given point.

*Positioners*

The positioners 18 and 20 are identical in construction comprising rectangular block-like members having spaced bores therethrough through which the cable members 16 and 17 are threaded. Set screws 30 and 31 on the respective positioners are provided to fixedly connect the upper positioner 18 to the cable member 16 and the lower positioner 20 to the cable member 17 for simultaneous movement therewith.

This construction and the attachment to the cables holds the positioners 18 and 20 away from the upper surface of the drawing board 1 and allows room for pivot pins 32 and 33 to be connected in said positioners 18 and 20 respectively, all of which is clearly shown in Figures 1 and 6 of the drawings.

Cable members 34 and 35 are pivoted around said pivot pins 32 and 33 and are removably connected at one end to arbitrary vanishing point pins 36 and 37, which are positioned at various points on the upper surface of the drawing board as hereinafter described. The cable members 34 and 35 extend over the pulleys 10 and 13 respectively and are connected at their remote ends to the weights 38 and 39 to hold them taut when attached to the vanishing point pins 36 and 37. Cable member 34 will form an acute angle with the ground line 7 and cable members 35 will form an obtuse angle with the ground line 7, whereby the two cables will intersect each other as is clearly shown in Figure 1 of the drawings.

Movement of either cross-arm 19 or 21 will produce corresponding movement in the cables 16 and 17 and the positioners 18 and 20 fixedly connected thereto, which will in turn change the point of intersection of the cables 34 and 35 with respect to each other.

A cable support member 37 shown in Figures 1 and 5 is connected in the axial line of the cables 16 and 17 to the upper surface of the drawing board and acts to support the cables 16 and 17 against undue lateral movement.

*Operation*

In operation, a first sheet of drawing paper having a plan view A is attached on the upper surface of the drawing board 1, above the straight edge member 5. A second elongated sheet of drawing paper having an elevation view B in the same scale as the plan view A, is slidably disposed on the upper surface of the drawing board 1 between the vertical guides 2 and 3, to extend downwardly and under the transverse member 4 so that the elevation view B has its lower edge in alignment with the upper edge of the transverse member 4 and upwardly under the cable members 16, 17, 31 and 32 to cover the whole area between the vertical guides 2 and 3, all of which is clearly shown in Figure 1 of the drawings.

The perspective view will be produced on the second slidable sheet in the area thereon above the elevation view between the vertical guides 2 and 3.

To establish arbitrary vanishing points within the drawing board where the vanishing point pins 36 and 37 will be attached, the horizon and eye station points must be chosen as they will determine the ultimate appearance of the finished perspective.

The horizon line is located first with reference to the elevation drawing B, such that a determinable distance C between the horizon line and the upper edge of the transverse member 4 is established. This distance C is transposed to the plan view and the site of the perspective view by measuring from the upper edge of the straight edge 5 for the plan view and from the ground line 7 for the proposed perspective view.

Next the eye station point D is selected at any point below the upper edge of the straight edge 5 and preferably although not necessarily within the limits of the plan view A such that a vertical line E perpendicular to the horizon line for the plan view A will pass through the plan view at some point. The position in the plan view A of the vertical line E can be established in the elevation view B and a second vertical line F is drawn in parallel to first vertical line E and perpendicular to the horizon lines for both the elevation and the proposed perspective view.

Through the eye station point D, two lines G and G' parallel to the respective cross-arms 28 and 29 are drawn and extended till they intersect the upper edge of the straight edge 5 as at H and H' and perpendiculars are dropped from these points to the horizon line for the plan view to establish distances I and J from the vertical line E.

By measuring off identical distances I' and J' from the vertical line F on the horizon line for the proposed perspective drawings, the points of attachment for the arbitrary vanishing point pins 36 and 37 are fixed.

The procedure is now simplified because the vanishing point pins 36 and 37 are affixed in position at these points with the respective cables 34 and 35 about the pivot pins 32 and 33 as above described. The vanishing point pins 36 and 37 are movable with the slidable second sheet as hereinafter described.

By picking a point P in the plan view A and bringing the cross-arms 28 and 29 in position so that they intersect over this point, the positioners 18 and 20 will be automatically positioned by movement therewith, which will in turn have the cable members 34 and 35 form a point of intersection. This merely establishes the vertical position for the point chosen. The horizontal position of the point is determined by locating the point in the elevation drawing and by sliding the elevation drawing B so that the horizontal plane of the point P is in alignment with the upper edge of the transverse member 4.

After the horizontal and vertical positions are determined a pencil mark P' is made representing the position thereof in the perspective drawing. This is repeated for the several points needed to complete the perspective and then the points are connected by lines to produce the finished perspective view.

While one form of the invention has been illustrated and described it will be understood that the invention is not to be limited to the specific construction or arrangement of parts shown, but that they may be duly modified within the invention defined by the claims.

What is claimed is:

1. A drafting apparatus for making perspective views of an object to be mounted on a drawing board for coaction with a plan view of the object fixedly connected thereon and a slidable drawing site for the perspective view having thereon an elevation view of the object comprising, predetermined arbitrary spaced vanishing point pins mounted on and slidable with said slidable drawing site, means connected to said vanishing point pins for transferring the vertical position of any point on said plan view to the drawing site of said perspective view, said slidable drawing site and elevation view movable to establish the horizontal position of said point in the drawing site.

2. A drafting apparatus as claimed in claim 1 wherein said means includes, continuous cables disposed for movement across said drawing board, cross-arms mounted on said cables and disposed to intersect over any point on said plan view, positioners for each cross-arm connected in spaced relation thereto on its respective cable and for simultaneous and equidistant movement therewith, means coacting with said positioners and said vanishing point pins to transfer said points to the drawing site.

3. A drafting apparatus as claimed in claim 1 wherein said means includes continuous cables disposed for movement about said drawing board, cross-arms mounted on said cables and disposed to intersect over any point on said plan view, positioners for each of said cross-arms connected in spaced relation thereto on its respective cable and for simultaneous and equidistant movement therewith, a pivot pin on each of said positioners, and cables about said pivot pins and connected to said vanishing point disposed in intersecting relationship to transfer the horizontal position of said point to the drawing site.

4. A drafting apparatus for making perspective views of an object to be mounted on a drawing board for coaction with a plan view of the object fixedly connected thereon and a slidable drawing site for the perspective view having thereon an elevation view of the object comprising, predetermined arbitrary spaced vanishing point pins mounted on a preset horizon line on said drawing site and slidable therewith, means slidably mounted on said drawing board and disposed to intersect for delineating any point on said plan view, means connected to said vanishing point pins in spaced relation to said first mentioned means and movable equidistant therewith to transfer the vertical position of said point to the drawing site, said slidable drawing site and elevation view movable to establish the horizontal position of said point in the drawing site.

5. A drafting apparatus for making perspective views of an object to be mounted on a drawing board for coaction with a plan view of the object fixedly connected thereon and a slidable drawing site for the perspective view having thereon an elevation view of the object comprising, predetermined arbitrary spaced vanishing point pins mounted on a preset horizon line on said drawing site and slidable therewith, means slidably mounted on said drawing board and disposed to intersect for delineating any point on said plan view, means connected to said vanishing point pins in spaced relation to said first mentioned means on said drawing board and movable equidistant therewith, said spaced means to coact with the vanishing point pins to transfer the vertical position of said point to the drawing site, said slidable drawing site and elevation view movable to establish the horizontal position of said point in the drawing site.

6. A drafting apparatus for making perspective views of an object to be mounted on a drawing board for coaction with a plan view of the object fixedly connected thereon and a slidable drawing site for the perspective view having thereon an elevation view of the object comprising, predetermined arbitrary spaced vanishing point pins mounted on and slidable with said slidable drawing site, means connected to said vanishing point pins for transferring the vertical position of any point on said plan view to the drawing site of said perspective view, a transverse reference member mounted on said drawing board to coact with said elevation view, said slidable drawing site and elevation view movable to establish the horizontal position of said point in the drawing site.

7. In combination, a drawing board having a plan view of an object fixedly connected thereto and a slidable drawing site for a perspective view having thereon an elevation view of the object to the same scale, and predetermined arbitrary spaced vanishing point pins mounted on and slidable with said slidable drawing site, means connected to said vanishing point pins for transferring the vertical position of any point from said plan view to said slidable drawing site, a transverse reference member to coact with said slidable drawing site and elevation view to allow movement of said slidable drawing site and elevation view thereunder to establish the horizontal position of said point in the drawing site.

8. In the combination as claimed in claim 7 wherein said means includes, continuous cables disposed for movement across said drawing board, cross-arms mounted on said cables and disposed to intersect over any point on said plan view, positioners for each cross-arm connected in spaced relation thereto on its respective cable and for simultaneous and equidistant movement therewith, means coacting with said positioners and said vanishing point pins to transfer said points to the drawing site.

9. In the combination as claimed in claim 7 wherein said means includes, continuous cables disposed for movement about said drawing board, cross-arms mounted on said cables and disposed to intersect over any point on said plan view, positioners for each of said cross-arms connected in spaced relation thereto on its respective cable and for simultaneous and equidistant movement therewith, a pivot pin on each of said positioners, and cables about said pivot pins and connected to said vanishing point disposed in intersecting relationship to transfer the horizontal position of said point to the drawing site.

10. A drafting apparatus mounted on a drawing board for plotting a perspective view of an object comprising, continuous cables mounted for movement about said drawing board, cross-arm supports fixedly connected each to separate cables for individual adjustment towards and away from one another, a cross-arm for each cross-arm support and disposed to intersect each other over any given point on said drawing board, positioners for each of said cross-arm supports connected to said cables in spaced relation thereto and for simultaneous and equidistant movement therewith, means connected to said positioners for transferring the vertical position of said given point to the plotting position for said perspective view on the drawing board, and means for establishing the horizontal position of said point by movement of the plotting position over said drawing board.

11. A drafting apparatus as claimed in claim 10 wherein said transfer means includes, arbitrary vanishing point pins in predetermined positions on said plotting position for the perspective view, single cables connected to at least one positioner and at least one of said vanishing point pins and disposed to intersect over said plotting position for the perspective view.

12. A drafting apparatus as claimed in claim 10 wherein said means for establishing the horizontal position of said given point includes, a transverse reference member, an elevation view mounted on and slidable with said plotting position for the perspective view on said drawing board, said plotting position and elevation view coacting with said transverse reference member to establish the horizontal position of said given point.

References Cited in the file of this patent

UNITED STATES PATENTS

| | | |
|---|---|---|
| 1,918,216 | Sachtleber | July 11, 1933 |
| 1,986,625 | De Lorenzi | Jan. 1, 1935 |
| 2,559,222 | Moore | July 3, 1951 |